United States Patent
Wood et al.

(10) Patent No.: US 12,150,443 B2
(45) Date of Patent: Nov. 26, 2024

(54) DECOY STAND AND SPEED CARRY SYSTEM

(71) Applicant: ICON OUTDOORS, LLC, Olive Branch, MS (US)

(72) Inventors: Michael T. Wood, Eads, TN (US); James L. Spence, Dyersburg, TN (US)

(73) Assignee: Icon Outdoors, LLC, Olive Branch, MS (US)

(*) Notice: Subject to any disclaimer, the term of this patent is extended or adjusted under 35 U.S.C. 154(b) by 0 days.

(21) Appl. No.: 18/380,999

(22) Filed: Oct. 17, 2023

(65) Prior Publication Data

US 2024/0041022 A1 Feb. 8, 2024

Related U.S. Application Data

(62) Division of application No. 17/228,933, filed on Apr. 13, 2021, now Pat. No. 11,825,833.

(60) Provisional application No. 63/106,605, filed on Oct. 28, 2020.

(51) Int. Cl.
*A01M 31/06* (2006.01)

(52) U.S. Cl.
CPC .................. *A01M 31/06* (2013.01)

(58) Field of Classification Search
CPC .......... A01M 31/06; A47F 8/02; A47F 7/148; A47F 3/147; A47F 5/01; F16M 2200/08
USPC .......... 43/3, 2.1; 211/33, 181.1, 41.7, 41.11, 211/85.15, 12, 133.2, 133.5, 126.8, 26.9; 248/153, 175, 302; 220/485
See application file for complete search history.

(56) References Cited

U.S. PATENT DOCUMENTS

| | | | |
|---|---|---|---|
| 1,782,042 A | 11/1930 | Kunkel | |
| 2,256,616 A | 9/1941 | Johnson et al. | |
| 2,894,706 A | 7/1959 | Cappio | |
| 3,532,225 A | 10/1970 | Reed | |
| 5,036,614 A * | 8/1991 | Jackson | A01M 31/06 43/3 |
| 5,375,363 A | 12/1994 | Higdon | |
| 5,595,012 A | 1/1997 | Coleman | |
| D468,144 S | 1/2003 | Shayo | |
| 6,945,161 B1 | 9/2005 | Battaglia et al. | |
| 7,040,219 B1 | 5/2006 | D'Amato et al. | |
| D774,356 S | 12/2016 | Maiorana et al. | |
| D788,876 S | 6/2017 | Brooks | |
| 2002/0178639 A1 | 12/2002 | Daniels | |
| 2005/0167381 A1 | 8/2005 | Fariello | |
| 2005/0268522 A1 * | 12/2005 | Foster | A01M 31/06 43/3 |
| 2006/0143969 A1 | 7/2006 | Lindaman | |
| 2007/0180754 A1 | 8/2007 | Neeley et al. | |

(Continued)

*Primary Examiner* — Darren W Ark
*Assistant Examiner* — Zoe Tam Tran
(74) *Attorney, Agent, or Firm* — Warren D. Schickli; Stites & Harbison PLLC

(57) ABSTRACT

A duck decoy includes a support and a decoy body carried on the support. The support includes a base section, a decoy support section and a stanchion connecting the base section to the decoy support section. A related method for carrying a plurality of duck decoys together in a single hand includes the steps of displacing each decoy body on each support from a home position to a carry position, stacking the base sections together while orienting the decoy bodies in different directions with chests together and holding the stacked base sections in one hand.

8 Claims, 15 Drawing Sheets

(56) References Cited

U.S. PATENT DOCUMENTS

| | | |
|---|---|---|
| 2013/0111800 A1 | 5/2013 | Pifer et al. |
| 2014/0263121 A1 | 9/2014 | Metcalfe et al. |
| 2014/0332645 A1 | 11/2014 | Brooks |
| 2016/0143265 A1 | 5/2016 | Bourlet |
| 2017/0049095 A1 | 2/2017 | Hanson |
| 2018/0125062 A1 | 5/2018 | Brooks et al. |
| 2019/0116782 A1* | 4/2019 | Hanson |
| 2020/0390086 A1* | 12/2020 | Butz ................. A01M 31/06 |

* cited by examiner

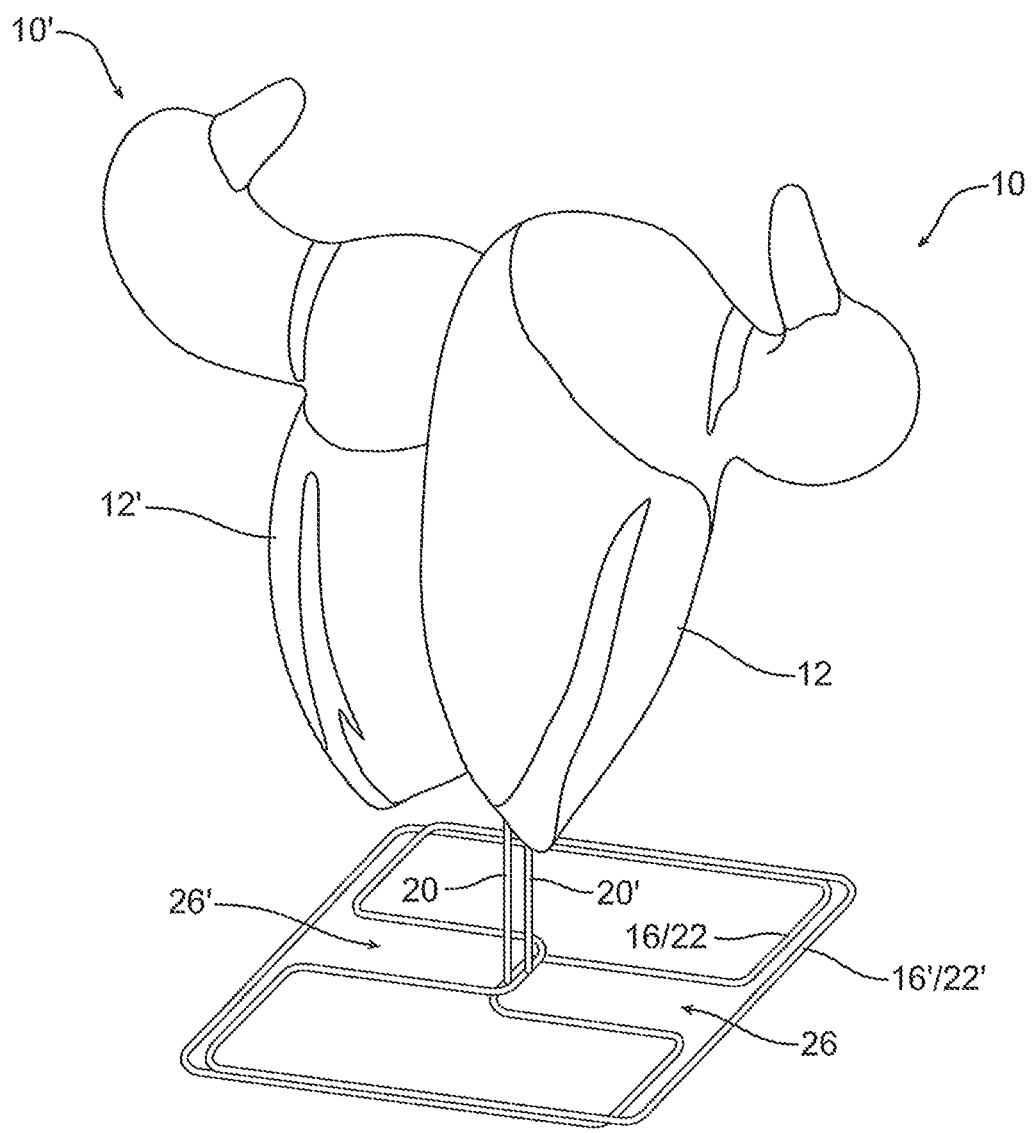

DECOY STAND AND SPEED CARRY SYSTEM

RELATED APPLICATIONS

This document is a division of prior U.S. patent application Ser. No. 17/228,933, filed Apr. 13, 2021, the full disclosure of which is incorporated herein by reference.

TECHNICAL FIELD

This document relates generally to the field of waterfowl hunting and, more particularly, to a new and improved duck decoy and related method for carrying a plurality of duck decoys in a simple and efficient manner.

BACKGROUND

Today, on the market, field decoys come with one of two types of stakes. The first type are pointed stakes that are pushed/pierce into the ground, with the decoy resting on the opposite end. The second type of stake has a wider, square/round/octagonal base, allowing the user to set the stake on top of the ground and is particularly useful in frozen ground/snow situations where one might have difficulty piercing the ground.

When setting up decoys before the hunt or taking down decoys after the hunt, today's products involve a very cumbersome process. The stakes are separate from the decoys. So you set the stakes out first, then you have to place the decoys onto the stakes. Some systems may allow for the stake to remain inside the decoy, which is better, but you have to handle each separately. When you pick up after a hunt, you remove the decoys and take them in, leaving the stakes, which are hard to find, or you remove the decoys, drop them on the ground and then pick up the stakes. After that, you come back for the decoys. Because these field decoys are full-body decoys, they are large and round in size. The most a man can conveniently carry at one time without special equipment is three. This is done by carrying two by the neck with one locked under one arm.

This document relates to a new and improved duck decoy that allows one to conveniently carry as many as 16 decoys at a time while the decoy bodies are secured to the stakes or supports. The bases of the new duck decoys include a slot or channel on one side that allows the bases of the duck decoys to slide up and around the center rod or stanchion of the other supports. This makes the duck decoys stackable, while the decoy bodies are maintained on the supports.

The supports include an upright rod or stanchion that allows you to pivot the decoy body downward, allowing the decoy body to rotate about 90 degrees, from (a) a relatively horizontal hunt or home position to (b) a relatively vertical or carry position where the head/beak of the decoy is pointing up towards the sky and the tail of the decoy is pointing to the ground. By turning the decoy vertical, this allows you to place four decoys, close to each other with their chests together.

By placing four decoys close to one another, with the four bases stacked, it is a simple matter for one to reach down and grab the bases, and lift and carry four decoys in one hand. If you have one set of four decoys in each hand, it allows you to easily carry eight decoys at one time. If you lay two four decoy sets on their sides and then butt the bases of the two sets together, one can now reach down, easily grab eight bases with one hand and carry eight per hand, totaling sixteen decoys at a time.

The carrying of up to sixteen decoys and bases at one time greatly reduces the number of trips required to set up the decoy field, saving precious time and energy. Thus, the new and improved duck decoy and related method of carrying a plurality of decoys at one time represents a significant advance in the decoy art.

SUMMARY

In accordance with the purposes and benefits described herein, a new and improved duck decoy is provided that is adapted to allow one to easily carry as many as eight duck decoys together in one hand. The duck decoy comprises (1) a support and (2) a decoy body. The support includes (a) a base section having a sidewall with an indentation, (b) a decoy support section and (c) a stanchion connected between the indentation and the decoy support section. The decoy body is carried on the decoy support section.

In one or more of the many possible embodiments of the duck decoy, the indentation defines an open channel.

In one or more of the many possible embodiments of the duck decoy, a pivot connects the stanchion to the decoy support section.

In one or more of the many possible embodiments of the duck decoy, the decoy support section includes a first segment on a first side of the pivot engaging the decoy body and a second segment on a second side of the pivot carrying a first retainer adapted for engaging said stanchion when said decoy body is pivoted into a home position.

In one or more of the many possible embodiments of the duck decoy, the decoy support section further includes a leg projecting from the first segment between the decoy body and the pivot. A second retainer is carried on the leg. The second retainer is adapted for engaging the stanchion when said decoy body is pivoted into a carry position. In one or more embodiments, the first and second retainers are mechanical clips.

In one or more of the many possible embodiments of the duck decoy, the sidewall is a circle having a major arc. In one or more of the many possible embodiments of the duck decoy, the sidewall is a concave polygon. In one or more of the many possible embodiments of the duck decoy, the indentation is a balbis. In one or more of the many possible embodiments of the duck decoy, the sidewall has three straight sides and a fourth side having a balbis. In one or more of the many possible embodiments of the duck decoy, the sidewall has six interior angles of about 90° and two interior angles of about 270°.

In accordance with an additional aspect, a new and improved method is provided for carrying a plurality of duck decoys together at one time, wherein each duck decoy includes a decoy body held on a support. The method comprises the steps of: (a) displacing each decoy body on each support from a home position to a carry position, (b) stacking bases of the supports together while orienting the decoy bodies in different directions with their chests together and (c) holding the stacked bases in one hand.

In one or more of the many possible embodiments of the method, the method includes the step of carrying up to four duck decoys in one hand. In one or more of the many possible embodiments of the method, the method includes the step of carrying up to eight duck decoys in one hand.

In one or more of the many possible embodiments of the method, the step of displacing includes the step of releasing a first retainer on each duck decoy from engagement with the support to displace the decoy body of each duck decoy from the home position.

In one or more of the many possible embodiments of the method, the step of displacing further includes pivoting the decoy body or each duck decoy following releasing the first retainer.

In one or more of the many possible embodiments of the method, the step of displacing still further includes engaging a second retainer of each duck decoy with the support when the decoy body of each duck decoy is pivoted into the carry position whereby the duck body of each duck decoy is held in the carry position.

In one or more of the many possible embodiments of the method, the method includes the steps of aligning a channel in the support of a second duck decoy with a stanchion of the support of a first duck decoy and positioning the base of the second duck decoy onto the base of the first duck decoy with the stanchion received in the channel of the second duck decoy.

In one or more of the many possible embodiments of the method, the method includes the steps of aligning a channel in the support of a third duck decoy with the stanchion of the first duck decoy and positioning the base of the third duck decoy onto the base of the second duck decoy with the stanchion received in the channel of the third duck decoy.

In one or more of the many possible embodiments of the method, the method includes the steps of aligning a channel in the support of a fourth duck decoy with the stanchion of the first duck decoy and positioning the base of the fourth duck decoy onto the base of the third duck decoy with the stanchion received in the channel of the fourth duck decoy.

In one or more of the many possible embodiments of the method, the method includes the step of repeating the following steps to make a second stacked set of four duck decoys:

(a) aligning a channel in the support of a second duck decoy with a stanchion of the support of a first duck decoy and positioning the base of the second duck decoy onto the base of the first duck decoy with the stanchion received in the channel of the second duck decoy;

(b) aligning a channel in the support of a third duck decoy with the stanchion of the first duck decoy and positioning the base of the third due decoy onto the base of the second duck decoy with the stanchion received in the channel of the third duck decoy; and (c) aligning a channel in the support of a fourth duck decoy with the stanchion of the first duck decoy and positioning the base of the fourth duck decoy onto the base of the third duck decoy with the stanchion received in the channel of the fourth duck decoy.

In one or more of the many possible embodiments of the method, the method may also include the step of orienting the bases of a first stacked set of four duck decoys to abut with the bases of the second stacked set of four duck decoys so as to allow one to carry eight duck decoys in one hand.

In one or more of the many possible embodiments of the method, the method includes the step of making two stacks of four duck decoys and orienting bases on the two stacks of duck decoys back-to-back or abutting so as to allow one to carry eight duck decoys in one hand.

In the following description, there are shown and described several preferred embodiments of the duck decoy and the related method of carrying a plurality of duck decoys together in one hand. As it should be realized, the duck decoy and method are capable of other, different embodiments and their several details are capable of modification in various, obvious aspects all without departing from duck decoy and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the patent specification, illustrate several aspects of the duck decoy and the related method and together with the description serve to explain certain principles thereof.

FIG. 4B is a perspective view showing two duck decoys stacked on the ground in the carry position.

Figure 1A:
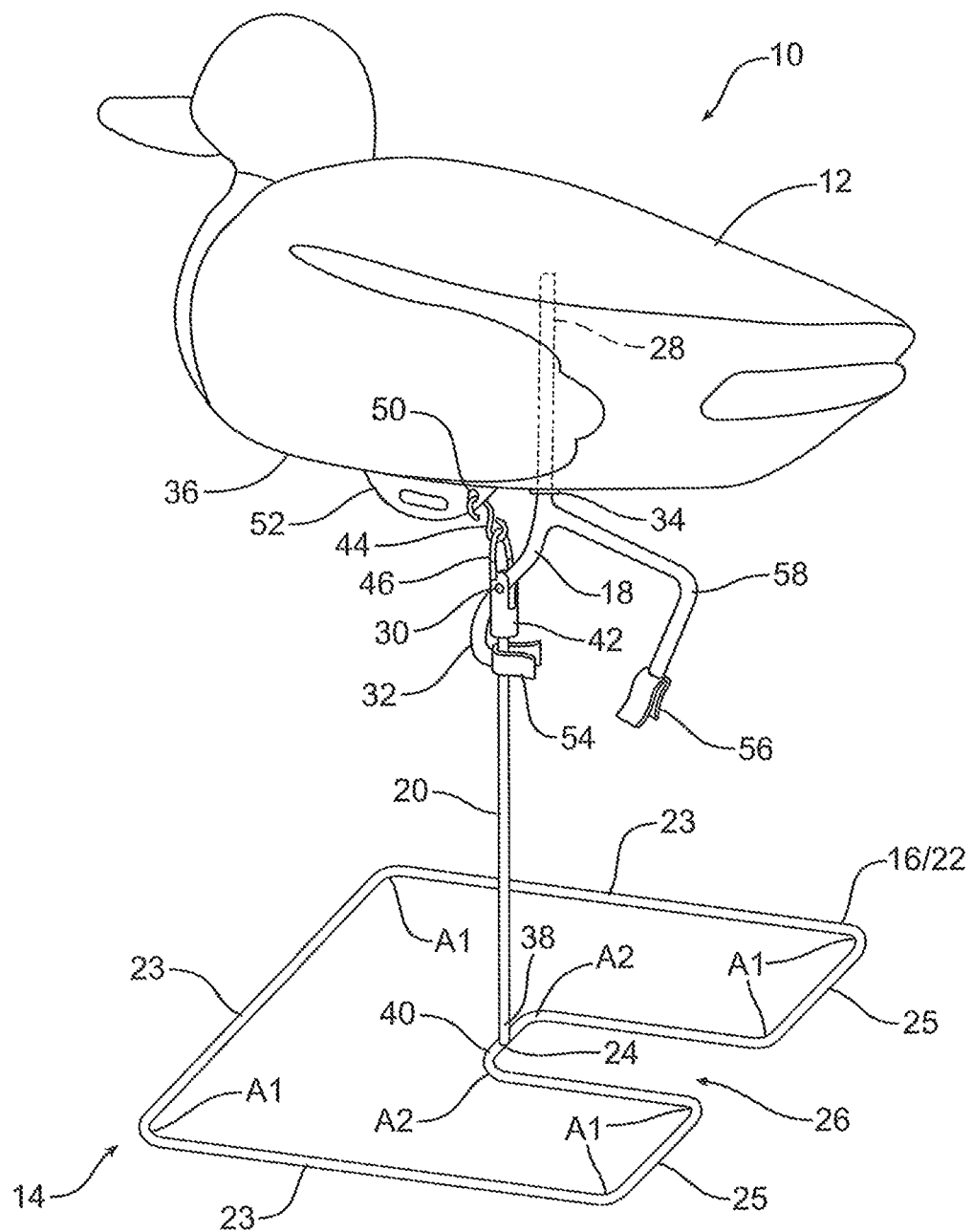
FIG. 1A is perspective view of a single duck decoy on the stand with the decoy body in the relatively horizontal hunt or home position.

Reference will now be made in detail to the present preferred embodiments of the duck decoy and method, examples of which are illustrated in the accompanying drawing figures.

DETAILED DESCRIPTION

Reference is now made to FIGS. 1A, 1B, 2A and 2B which illustrate the new and improved duck decoy 10. That duck decoy 10 includes a decoy body 12 carried upon a support 14. The decoy body 12 may be made to provide a life-like image of a duck as illustrated. The decoy body 12 may be made from any appropriate material including but not necessarily limited to plastic, composite, wood or the like. The support 14 may be made from metal wire or other appropriate material and shaped to provide a stable structure for holding the decoy body 12 in a desired position when positioned on the ground.

The support 14 includes a base section 16, a decoy support section 18 and a stanchion 20. In the illustrated embodiment, the base section 14 includes a side wall 22 in the form of a concave polygon having an indentation 24 that defines an open channel, generally designated by reference numeral 26.

More specifically, the base 16 may substantially outline a U-shape having three straight sides 23 and a fourth side 25 including the indentation 24 which may take the form a balbis. As illustrated, sideman 22 may even define a U-shaped pentomino having six interior angles A1 of about 90 degrees and two interior angles A2 of about 270 degrees. In other embodiments, the sidewall 22 may be substantially circular with a major arc. In fact, substantially any shaped sidewall with an indentation 24 and open channel 26 that provides a stable base for supporting the decoy body 12 may be used.

The decoy support section 16 of the illustrated embodiment includes a first segment 28 on a first side of a pivot 30 and a second segment 32 on a second side of the pivot. The first segment 28 is engaged with and received in a receiver or bore 34 in the bottom wall 36 of the decoy body 12 so that the decoy body is carried or supported on the first segment.

The stanchion 20 extends between the indentation 24 in the base section 16 and the decoy support section 18. More particularly, the proximal end 38 of the stanchion 20 is connected to the end wall 40 of the indentation 24 while the distal end includes a pivot yoke 42 of the stanchion that receives and holds the pivot 30. As a result of this arrangement, the decoy support section 18 may be pivoted with respect to the stanchion 20. This, in turn, allows the decoy body 12, carried on the first segment 28 to be pivoted about the pivot 30 between a hunt or home position illustrated in FIG. 1A and a vertical or carry position illustrated in FIG. 2A.

Figure 3:
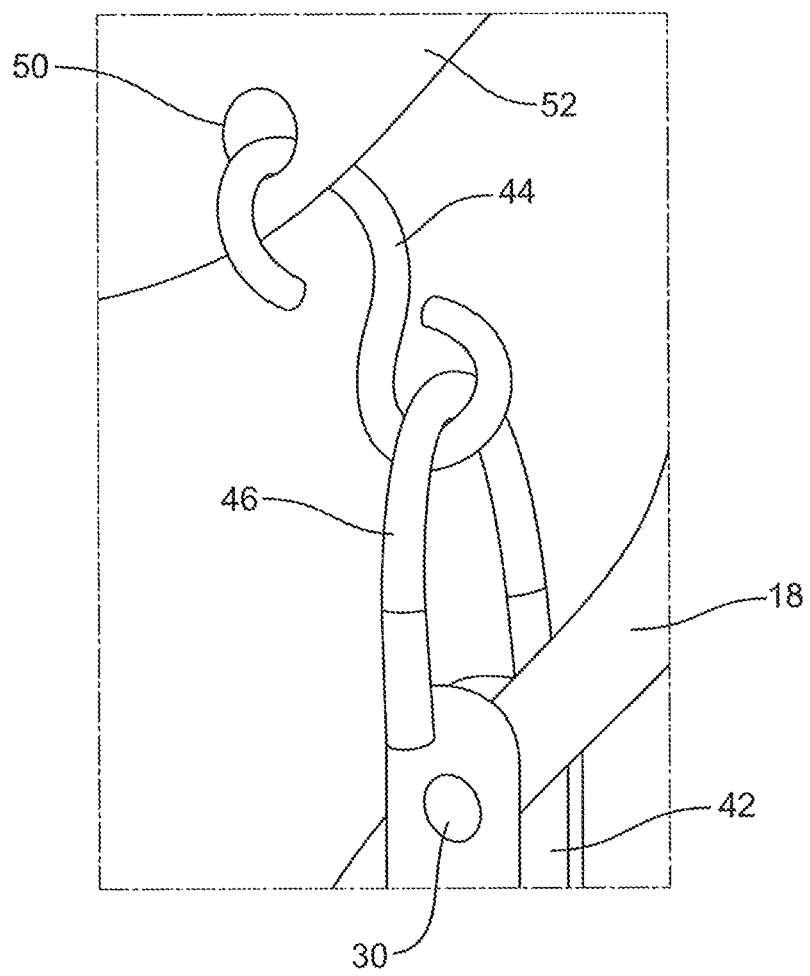
FIG. 3 is a detailed view of the latch that secures the decoy body in place on the wire support.

As best shown in FIG. 3, an optional latch or fastener 44 may be carried on a lug or loop 46 depending from the yoke 42 of the stanchion 20 or the pivot 30. In the illustrated embodiment, the fastener 44 is an open link that may be passed through an aperture 50 in the bracket 52 on the bottom wall 36 of the decoy body 12 to secure the decoy body on the first segment 28 of the decoy support section 18. The open link of the fastener 44 may be withdrawn from the aperture 50 in the bracket 52 in order to remove the decoy body 12 from the first segment 28 of the decoy support section 18 when desired.

Figure 1B:
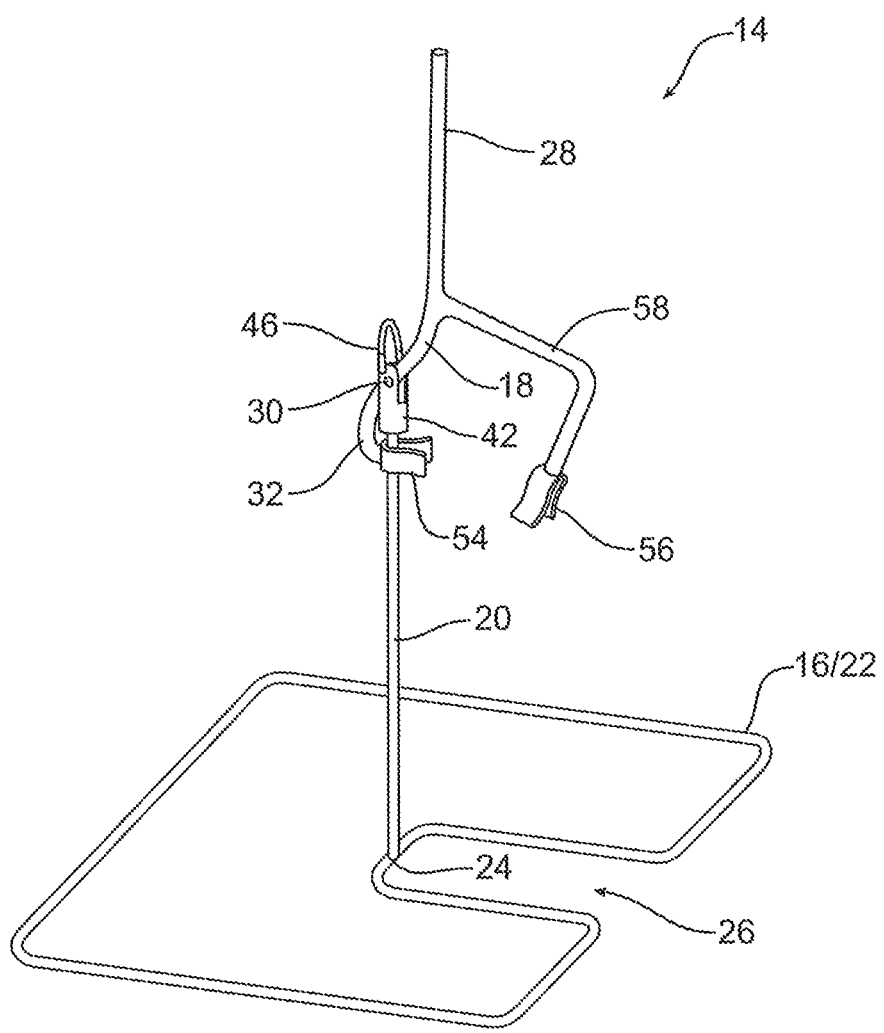
FIG. 1B is the same as FIG. 1A except that the decoy body has been removed from the wire support.

As best illustrated in FIGS. 1A and 1B, a first retainer 54 is carried on the second segment 32 of the decoy support section 18. The first retainer 54 is adapted to engage the stanchion 20 when the decoy body 12 is pivoted into the hunt or home position as illustrated in FIG. 1A. More specifically, the first retainer 54 releasably holds the decoy body 12 in the hunt or home position.

Figure 2A:
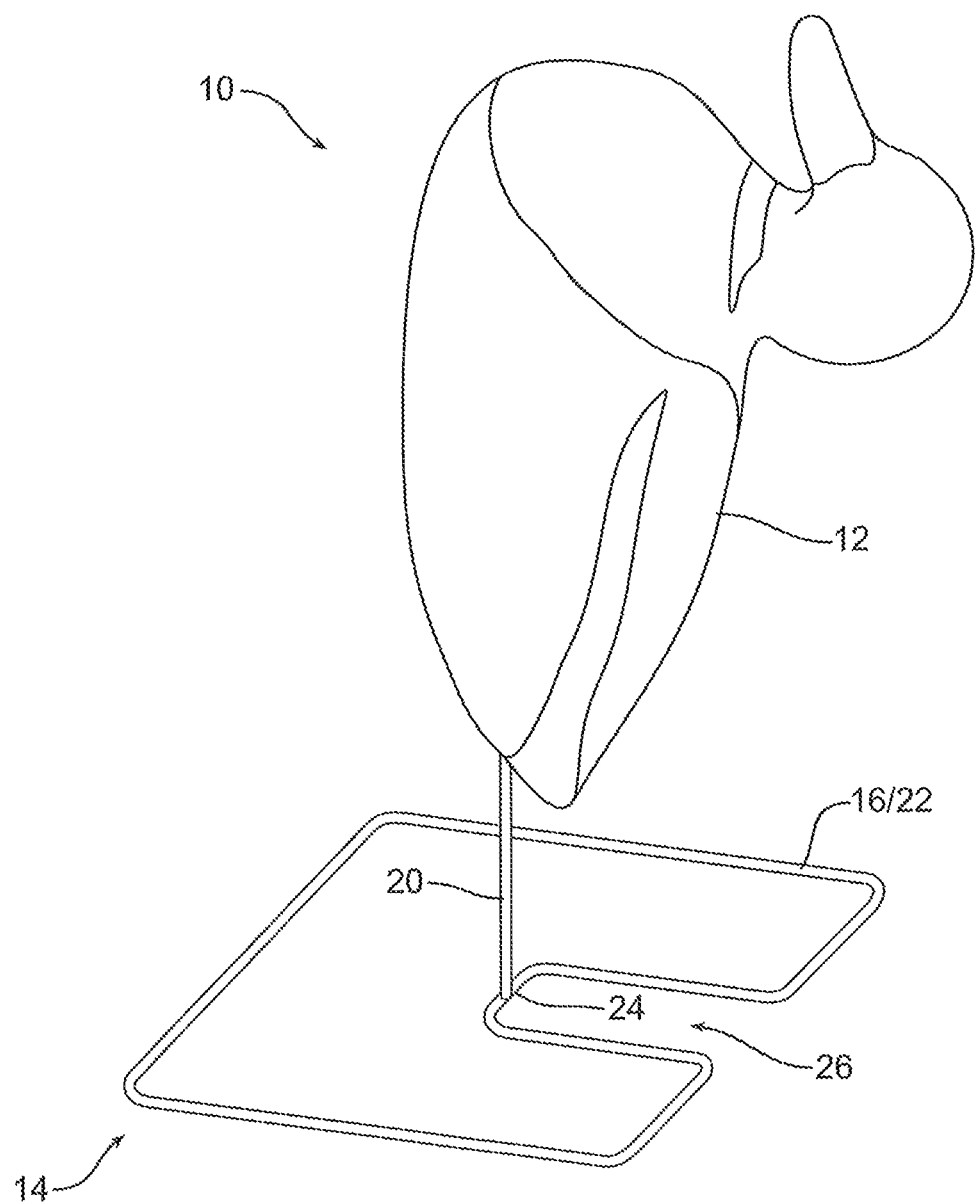
FIG. 2A is a perspective view of a single duck decoy on the stand with the decoy in the relatively vertical or carry position.
Figure 2B:
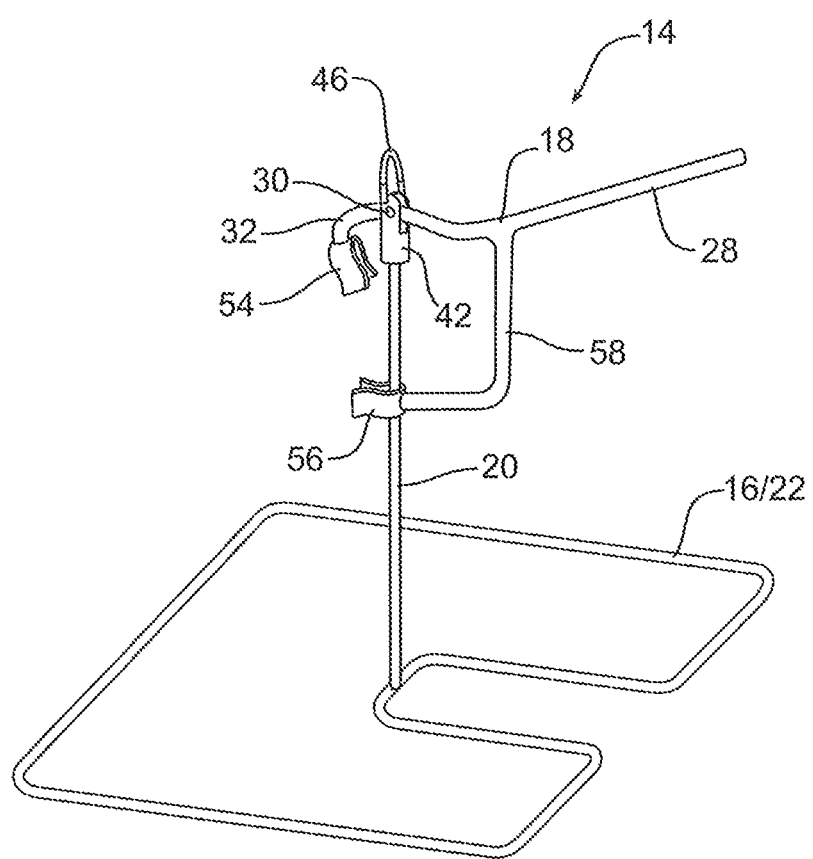
FIG. 2B is the same as FIG. 2A except that the decoy body has been removed from the wire support.

As best illustrated in FIGS. 1B and 2B, a second retainer 56 is carried on the end of an L-shaped leg 58 projecting from the first segment 28 of the decoy support section 18 between the decoy body 12 and the pivot 30. This second retainer 56 is adapted to engage the stanchion 20 when the decoy body 12 is pivoted into the vertical or carry position illustrated in FIG. 2A. More specifically, the second retainer 56 releasable holds the decoy body 12 in the vertical or carry position.

The first and second retainers 54, 56 may comprise any suitable structure to perform the indicated function. For example in at least one possible embodiment, one or more of the retainers 54, 56 may comprise a mechanical adapted to resiliently engage and squeeze or hold the stanchion 20 while also allowing for selective release from the stanchion when desired. In yet another example, one or more of the retainers 54, 56 may comprise a magnet where the stanchion is made from a magnetic material.

Figure 4A:
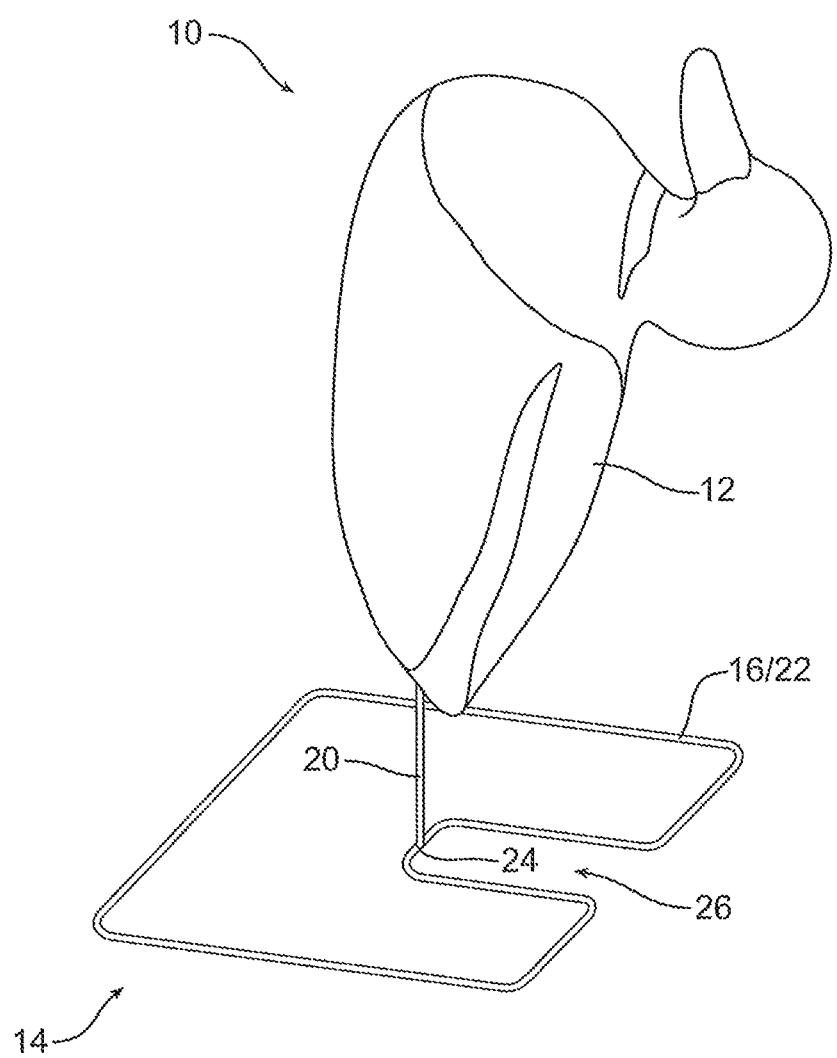
FIG. 4A is a perspective view showing one duck decoy on the ground in the carry position.
Figure 4C:
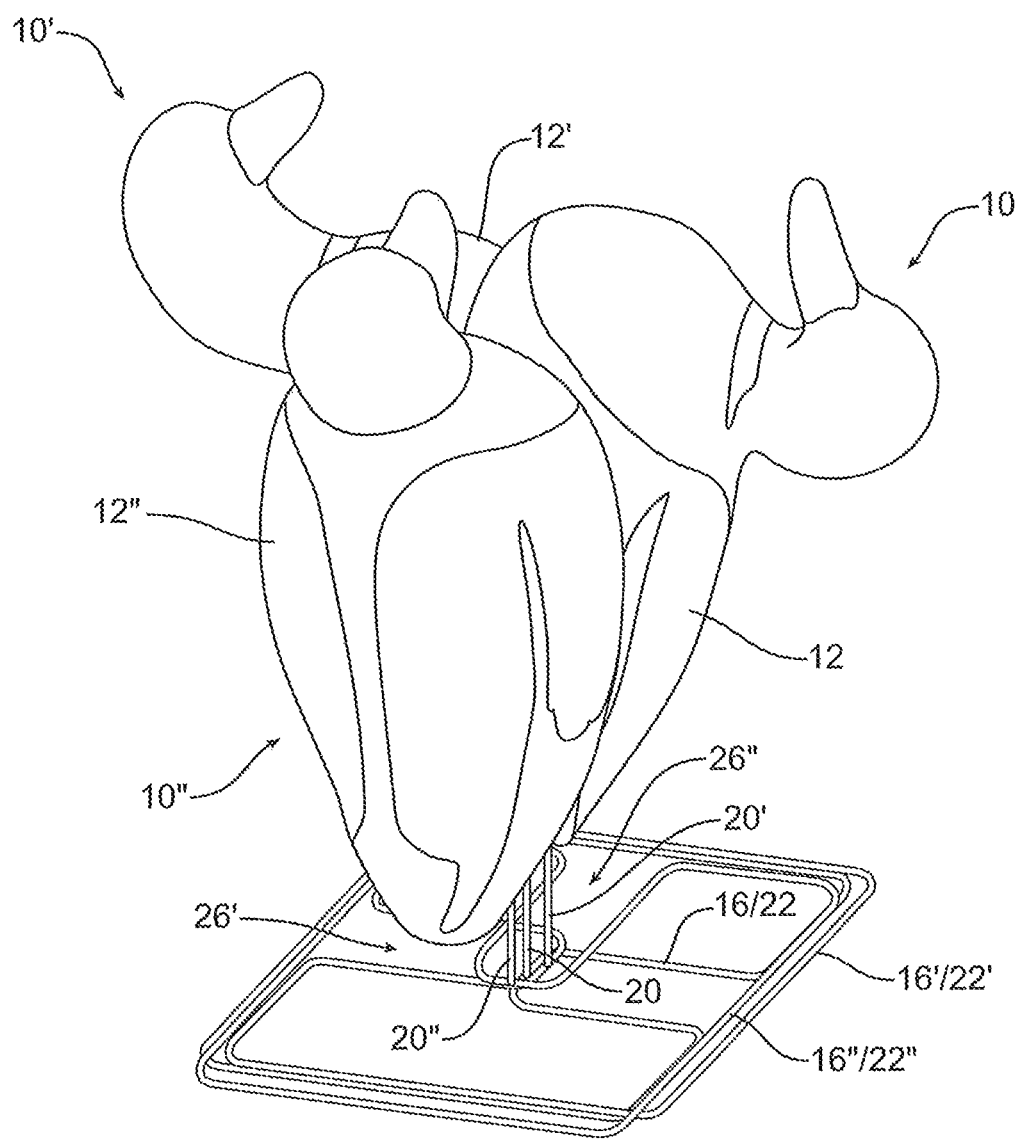
FIG. 4C is a perspective view illustrating three duck decoys stacked on the ground in the carry position.
Figure 4D:
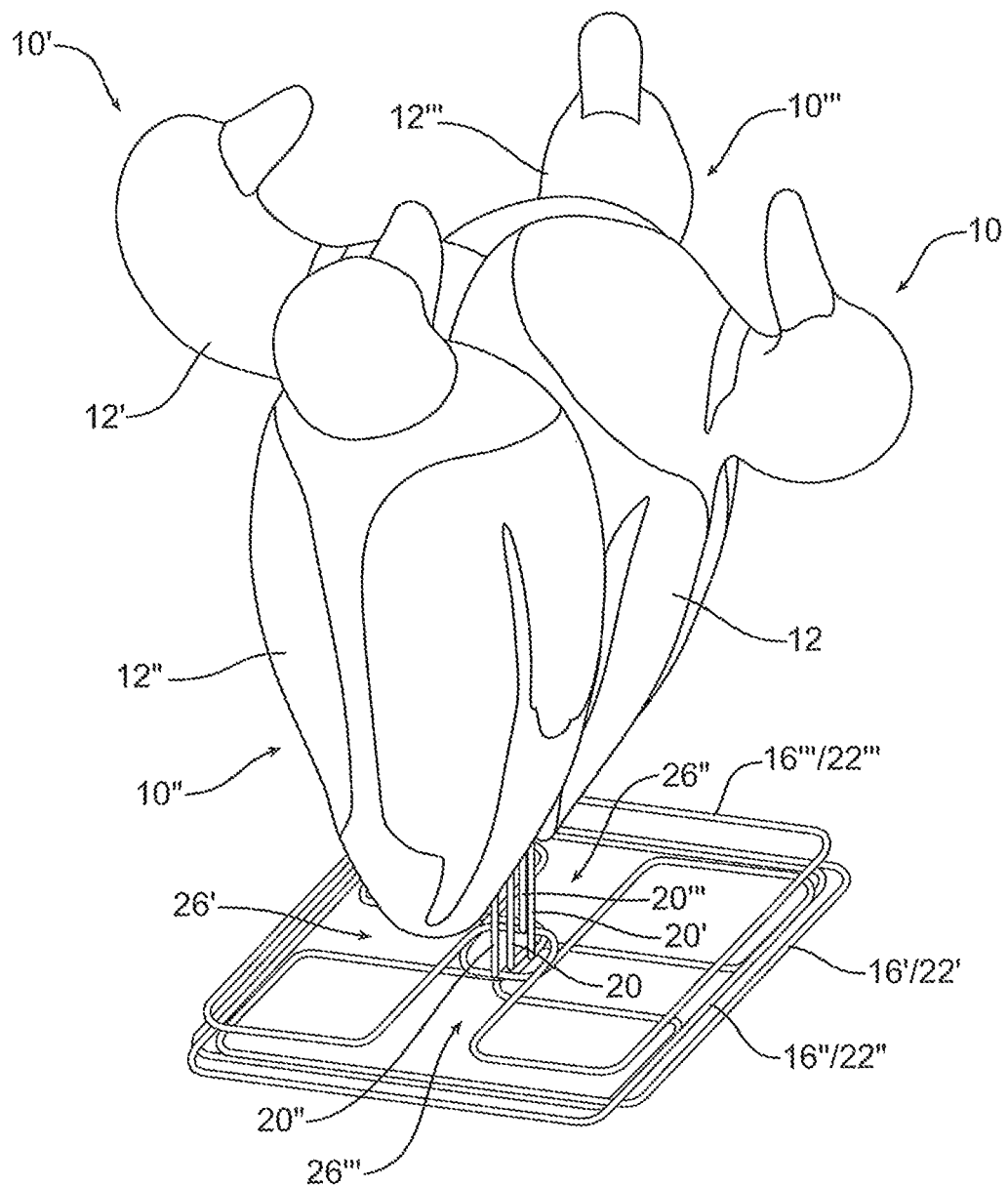
FIG. 4D is a perspective view illustrating four duck decoys stacked on the ground in the carry position.
Figure 4E:
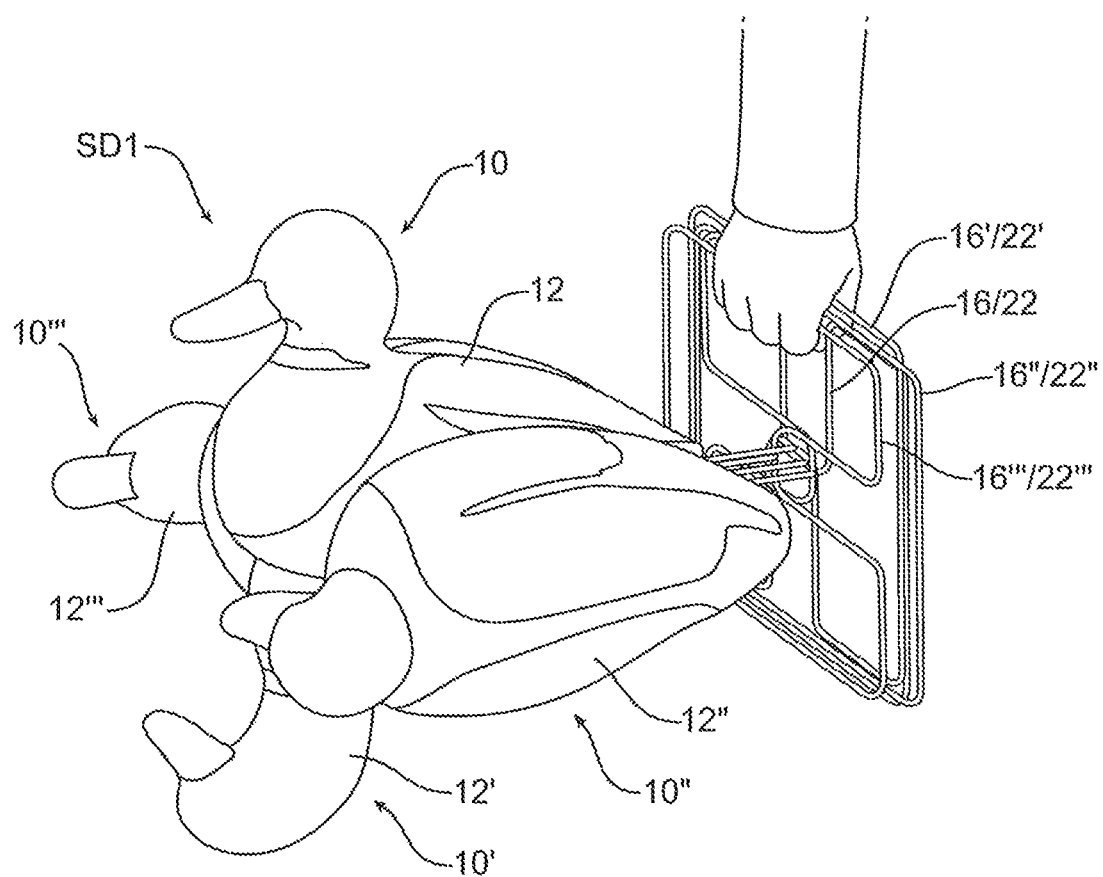
FIG. 4E, is a perspective view illustrating four duck decoys being carried in one hand.
Figure 5A:
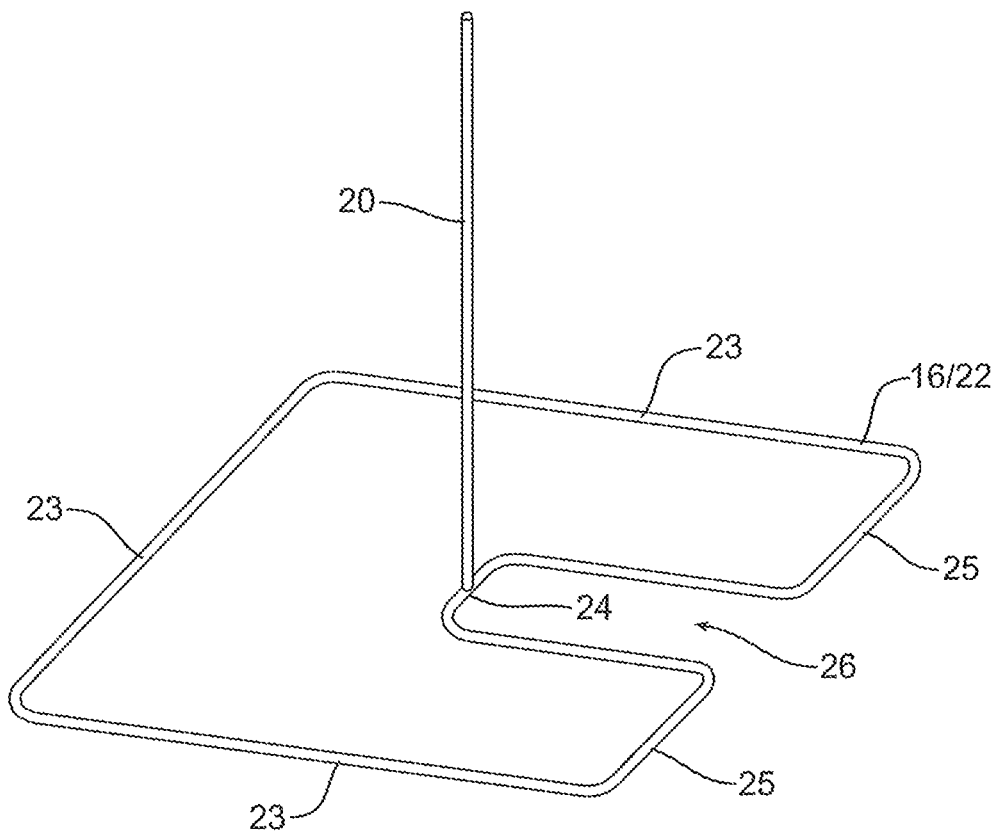
FIGS. 5A-5D are the same as FIGS. 4A-4D except that the decoy bodies have been removed from the wire supports to more clearly illustrate how the supports of the duck decoys are nested together.
Figure 5B:
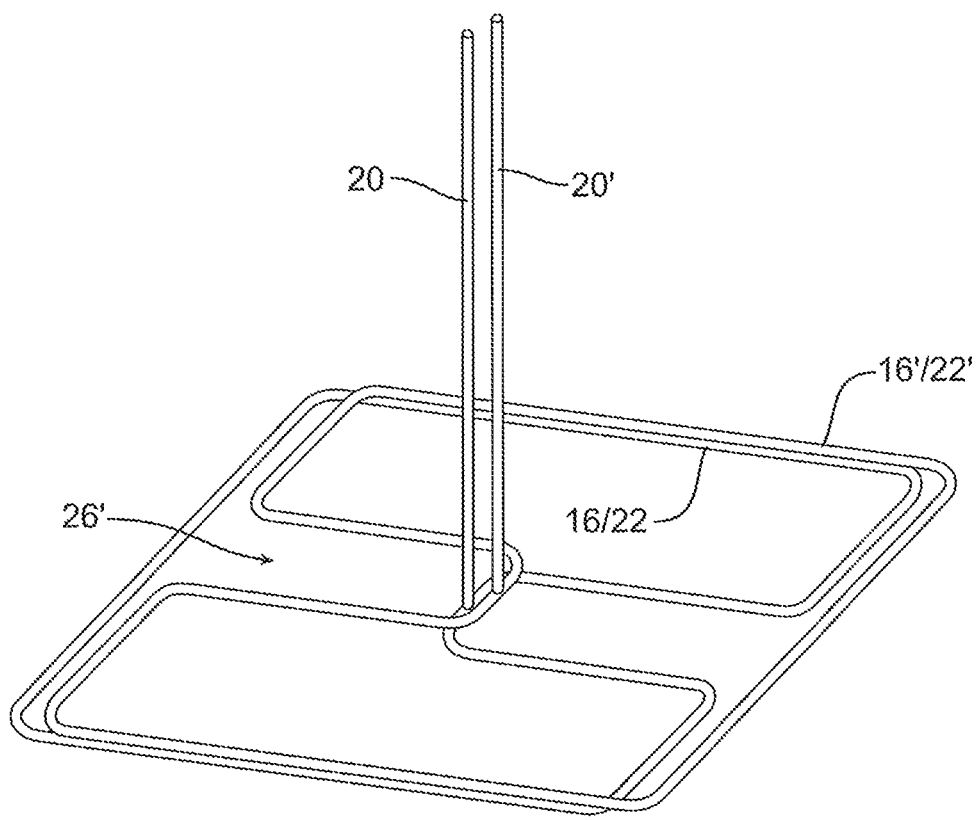
Figure 5C:
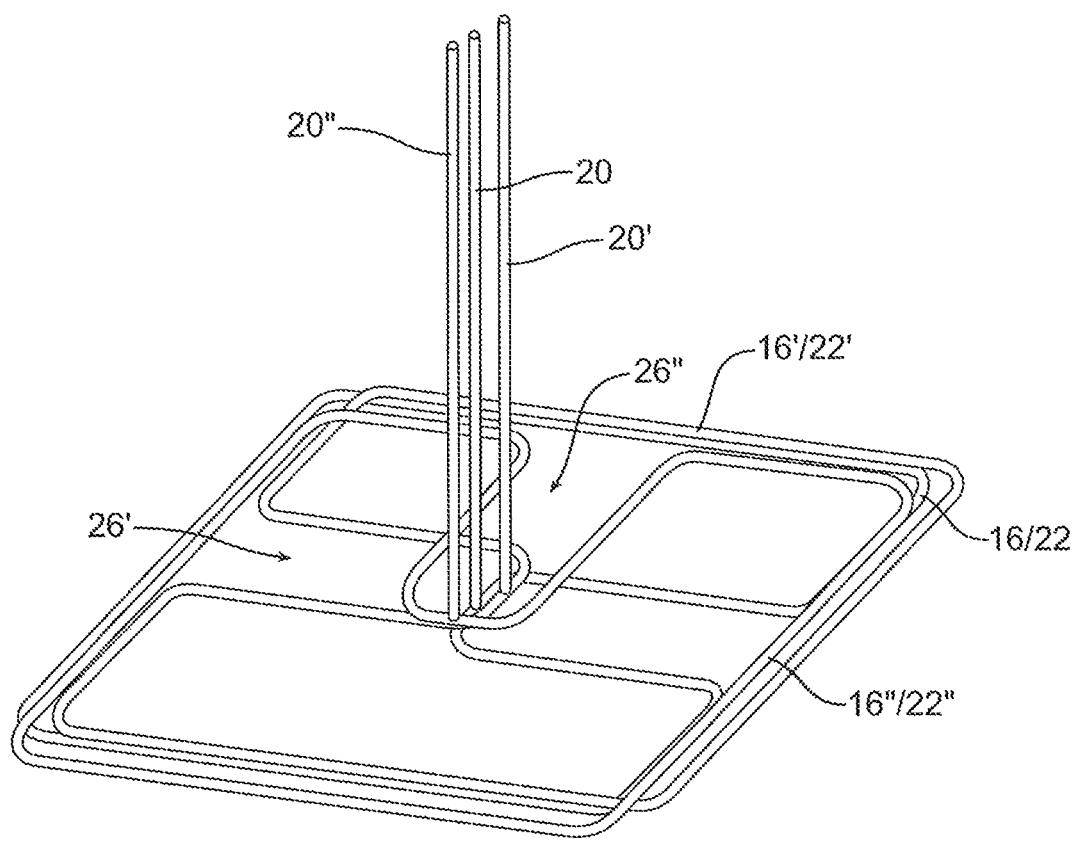
Figure 5D:
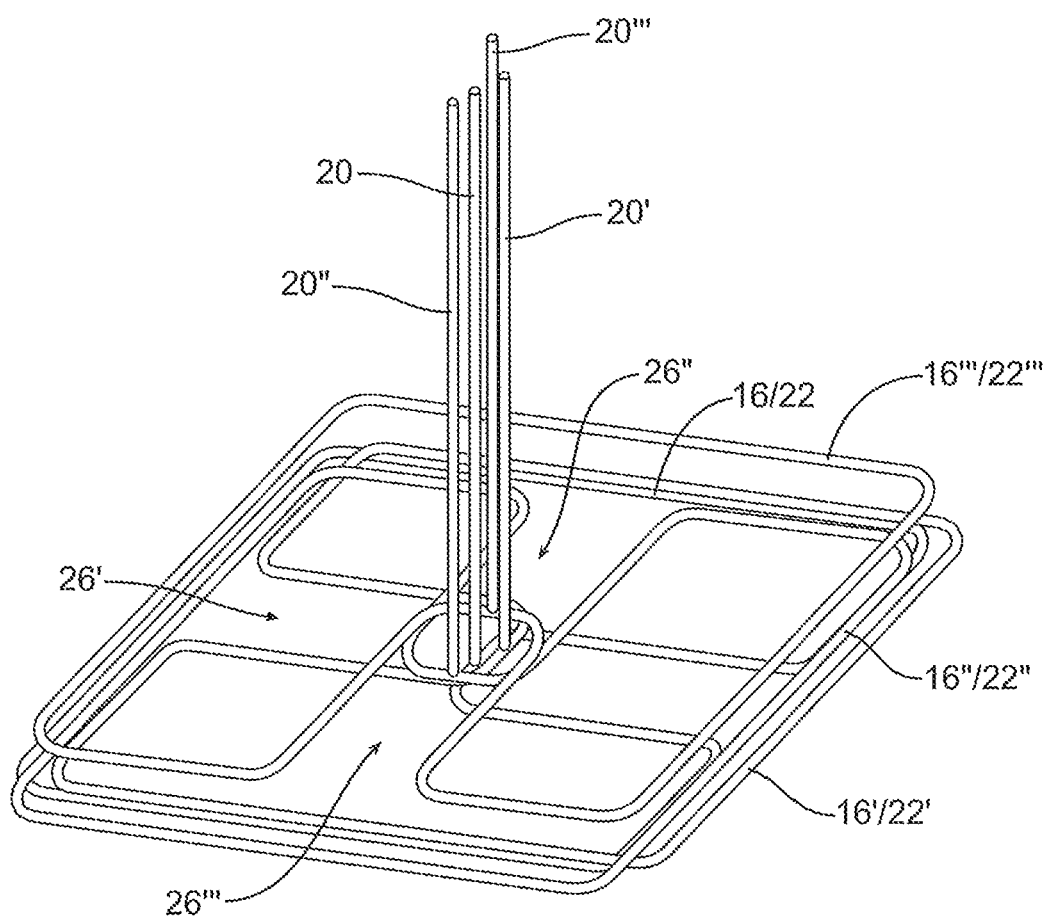
Figure 6:
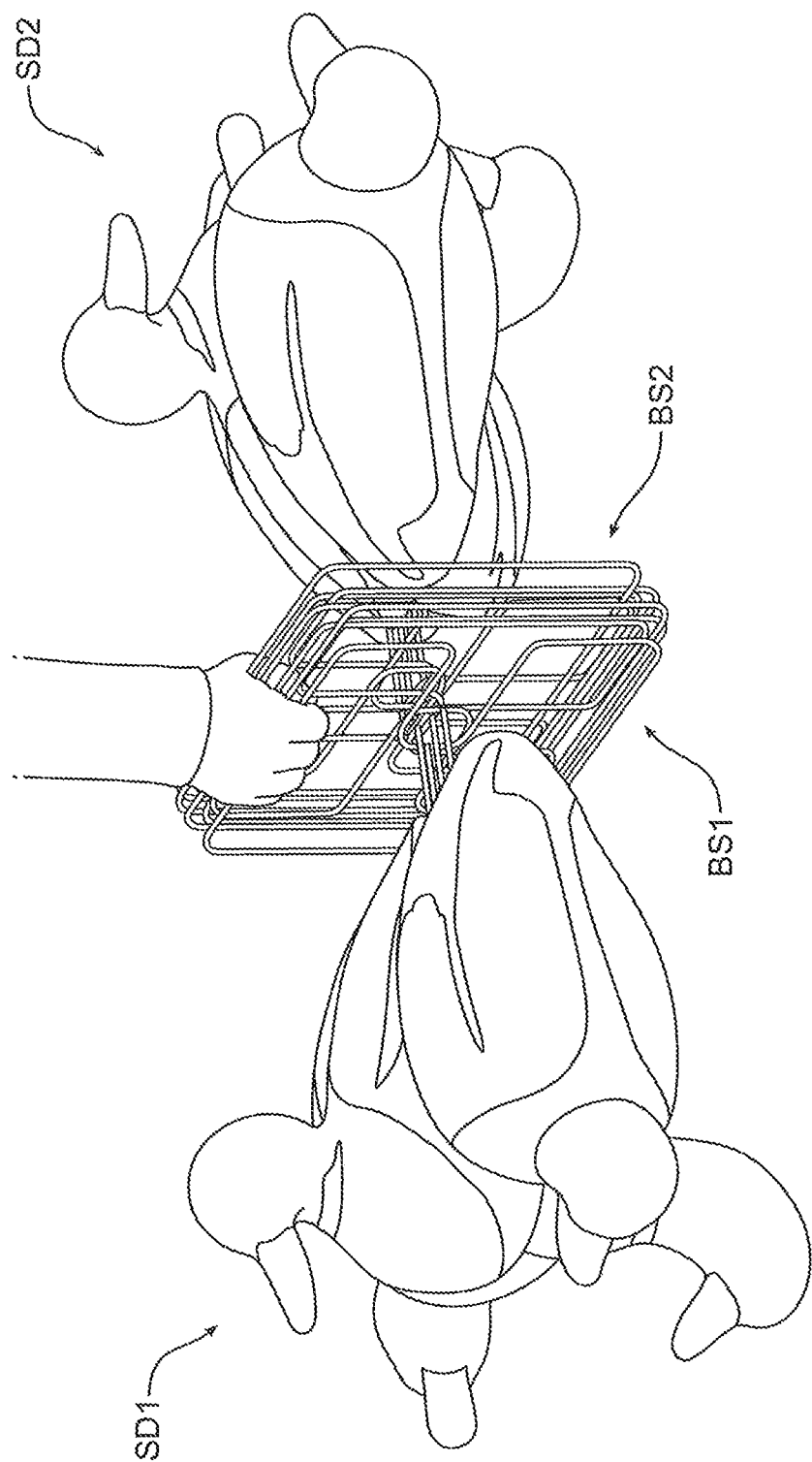
FIG. 6 illustrates how eight duck decoys are carried in a single hand.

As should be appreciated from viewing FIGS. 4A-4E, 5A-5D and 6, the duck decoy 10 allows for a new and improved method of carrying a plurality of duck decoys together in one hand. That method includes the step of displacing each decoy body 12 on each support 14 of the plurality of decoys to be carried from the hunt or home position illustrated in FIG. 1A to the vertical or carry position illustrated in FIGS. 2A and 4A. This step is followed by the stacking of the base sections 16 of the supports 14 together while orienting the decoy bodies 12 in different directions so that their chests are positioned together. See FIG. 4D. Next is the step of holding the stacked base sections 16 in one hand. In this way, one may carry four duck decoys 10 in one hand as illustrated in FIG. 4E or as many as eight duck decoys in one hand as illustrated in FIG. 6.

More particularly, the displacing step includes releasing the first retainer 54 on each duck decoy 10 to be carried from engagement with the stanchion 20 of the support 14 in order to displace the decoy body 12 from the home position. This is followed by the step of pivoting each of the decoy bodies 12 about the pivot 30 into the vertical or carry position. Next is the step of engaging the second retainer 56 of each duck decoy 10 with the stanchion 20 of the support 14 as the decoy body is pivoted into the vertical or carry position whereby the decoy body is held in the carry position.

The stacking step includes the steps of aligning the opening of the open channel 26' in the support 14' of the second duck decoy 10' with the stanchion 20 of the first duck decoy 10 and positioning the base section 16' of the second duck decoy onto or against the base section 16 of the first duck decoy with the stanchion of the first duck decoy received in the channel of the second duck decoy (see FIG. 4B).

Next, the stacking step includes the steps of aligning the opening of the open channel 26" in the support 14" of the third duck decoy 10" with the stanchion 20 of the first duck decoy 10 and the stanchion 20' of the second dock decoy 10' and positioning the base section 16" of the third duck decoy onto or against the base section 16' of the second duck decoy with the stanchions of the first and second duck decoys received in the channel of the third duck decoy (see FIG. 4C).

Next, the stacking step includes the steps of aligning the opening of the open channel 26'" in the support 14'" of the fourth duck decoy 10'" with the stanchions 20, 20' and 20" of the first, second and third duck decoys 10, 10' and 10" and positioning the base section 16'" of the fourth duck decoy onto or against the base section 16" of the third duck decoy with the stanchions of the first, second and third cluck decoys received in the channel of the fourth duck decoy (see FIG. 4D illustrating the first set of four stacked decoys SD1). This first set of four stacked decoys is ready to be carded in one hand as illustrated in FIG. 4E.

If one wishes to carry eight duck decoys 10 in one hand as illustrated in FIG. 6, the displacing and stacking steps (including the aligning and positioning steps) outlined above may be repeated to make a second set of four stacked decoys SD2. Next is the orienting of the base sections BS1 of the first set of stacked decoys SD1 to abut with the base sections BS2 of the second set of stacked decoys SD2 so as bring together eight sides of the base sections eight duck decoys allowing all eight to be grasped and carried in one hand. Note that the decoy bodies of the two sets of a stacked decoys SD1, SD2 extend away from each other in opposite directions.

Each of the following terms written in singular grammatical form: "a", "an", and "the", as used herein, means "at least one", or "one or more". Use of the phrase "One or more" herein does not alter this intended meaning of "a", "an", or "the". Accordingly, the terms "a", "an", and "the", as used herein may also refer to, and encompass, a plurality of the stated entity or object, unless otherwise specifically defined or stated herein, or, unless the context clearly dictates otherwise. For example, the phrases: "a unit", "a device", "an assembly", "a mechanism", "a component", "an element", and "a step or procedure", as used herein, may also refer to, and encompass, a plurality of units, a plurality of devices, a plurality of assemblies, a plurality of mechanisms, a plurality of components, a plurality of elements, and, a plurality of steps or procedures, respectively.

Each of the following terms: "includes", "including", "has", "having", "comprises", and "comprising", and, their linguistic/grammatical variants, derivatives, or/and conjugates, as used herein, means "including, but not limited to", and is to be taken as specifying the stated component(s), feature(s), characteristic(s), parameter(s), integer(s), of step(s), and does not preclude addition of one or more additional component(s), feature(s), characteristic(s), parameter(s), integer(s), step(s), or groups thereof.

The term "method", as used herein, refers to steps, procedures, manners, means, or/and techniques, for accomplishing a given task including, but not limited to, those steps, procedures, manners, means, or/and techniques, either known to, or readily developed from known steps, procedures, manners, means, or/and techniques, by practitioners in the relevant field(s) of the disclosed invention.

Terms of approximation, such as the terms about, substantially, approximately, etc., as used herein, refers to ±10% of the stated numerical value. Use of the terms concentric, parallel or perpendicular are meant to mean approximately meeting this condition, unless otherwise specified.

It is to be fully understood that certain aspects, characteristics, and features, of the duck decoy and method, which are, for clarity, illustratively described and presented in the context or format of a plurality of separate embodiments, may also be illustratively described and presented in any suitable combination or sub-combination in the context or format of a single embodiment. Conversely, various aspects, characteristics, and features, of the eye implant and method which are illustratively described and presented in combination or sub-combination in the context or format of a single embodiment may also be illustratively described and presented in the context or format of a plurality of separate embodiments.

Although the duck decoy and method of this disclosure have been illustratively described and presented by way of specific exemplary embodiments, and examples thereof, it is evident that many alternatives, modifications, or/and variations, thereof, will be apparent to those skilled in the art. Accordingly, it is intended that all such alternatives, modifications, or/and variations, fall within the spirit of, and are encompassed by, the broad scope of the appended claims.

What is claimed:

1. A method of carrying a plurality of duck decoys wherein each duck decoy includes a decoy body held on a support, the method comprising:
   displacing each decoy body on each support from a home position to a carry position;
   stacking bases of the supports together while orienting the decoy bodies in different directions; and
   holding the stacked bases in one hand wherein the displacing includes (a) releasing a first retainer on each duck decoy from engagement with the support on each duck decoy to displace the decoy body of each duck decoy from the home position, (b) pivoting the decoy body of each duck decoy following releasing the first retainer, and (c) engaging a second retainer of each duck decoy with the support on each duck decoy when the decoy body of each duck decoy is pivoted into the carry position whereby the duck body of each duck decoy is held in the carry position, and wherein the stacking includes aligning a channel in the support of a second duck decoy with a stanchion of the support of a first duck decoy and positioning the base of the second duck decoy against the base of the first duck decoy with the stanchion of the support of the first duck decoy received in the channel of the second duck decoy.

2. The method of claim 1, including carrying up to four duck decoys in the one hand by engaging the supports.

3. The method of claim 1, including carrying up to eight duck decoys in the one hand by engaging the supports.

4. The method of claim 1, wherein the stacking includes aligning a channel in the support of a third duck decoy with the stanchion of the first duck decoy and positioning the base of the third duck decoy against the base of the second duck decoy with the stanchion of the support of the first duck decoy received in the channel of the third duck decoy.

5. The method of claim 4, wherein the stacking including aligning a channel in the support of a fourth duck decoy with the stanchion of the first duck decoy and positioning the base of the fourth duck decoy against the base of the third duck decoy with the stanchion of the support of the first duck decoy received in the channel of the fourth duck decoy.

6. The method of claim 5 including:
   aligning a channel in the support of a sixth duck decoy with a stanchion of the support of a fifth duck decoy and positioning the base of the sixth duck decoy against the base of the fifth duck decoy with the stanchion of the support of the fifth duck decoy received in the channel of the sixth duck decoy;
   aligning a channel in the support of a seventh duck decoy with the stanchion of the fifth duck decoy and positioning the base of the seventh duck decoy against the base of the sixth duck decoy with the stanchion of the support of the fifth duck decoy received in the channel of the seventh duck decoy; and
   aligning a channel in the support of an eighth duck decoy with the stanchion of the fifth duck decoy and positioning the base of the eighth duck decoy against the base of the seventh duck decoy with the stanchion of the support of the fifth duck decoy received in the channel of the eighth duck decoy.

7. The method of claim 5, further including orienting the bases of a first stacked set of four duck decoys to abut with the bases of a second stacked set of four decoys so as to allow one to carry eight duck decoys in one hand.

8. The method of claim 1, including steps of making two stacks of four duck decoys and orienting the bases of the two stacks of four duck decoys to be abutting so as to allow one to carry eight duck decoys in one hand.

* * * * *